(12) United States Patent
Trejo et al.

(10) Patent No.: US 12,171,234 B2
(45) Date of Patent: Dec. 24, 2024

(54) SEXUAL ATTRACTION PHEROMONE OF TRIBOLIUM CASTANEUM AND INSECT CONTROL DEVICE

(71) Applicants: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE LA PLATA (UNLP), La Plata / Prov. de Buenos Aires (AR)

(72) Inventors: Sebastián Alejandro Trejo, Endsenada Prov. de Buenos Aires (AR); Sebastián Reinoso, La Plata / Prov. de Buenos Aires (AR); Walter Alberto Vargas, La Plata / Prov. de Buenos Aires (AR); Eliana Abrahamovich, La Plata / Prov. de Buenos Aires (AR); Nicolás Pedrini, La Plata / Prov. de Buenos Aires (AR); Juan Roberto Girotti, La Plata / Prov. de Buenos Aires (AR); Marta Patricia Juárez, La Plata / Prov. de Buenos Aires (AR)

(73) Assignees: YPF TECNOLOGÍA S.A., Ciudad Autonoma de Buenos Aires (AR); CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE LA PLATA (UNLP), La Plata/Prov. de Buenos Aires (AR)

( * ) Notice: Subject to any disclaimer, the term of this patent is extended or adjusted under 35 U.S.C. 154(b) by 741 days.

(21) Appl. No.: 16/811,928

(22) Filed: Mar. 6, 2020

(65) Prior Publication Data
US 2020/0281206 A1    Sep. 10, 2020

Related U.S. Application Data

(60) Provisional application No. 62/815,536, filed on Mar. 8, 2019.

(51) Int. Cl.
*A01M 1/20* (2006.01)
*A01M 1/02* (2006.01)
(Continued)

(52) U.S. Cl.
CPC ............... *A01N 49/00* (2013.01); *A01M 1/02* (2013.01); *A01N 65/00* (2013.01); *A01M 1/2005* (2013.01)

(58) Field of Classification Search
CPC ............................. A01M 1/02; A01M 1/2005
(Continued)

(56) References Cited

U.S. PATENT DOCUMENTS

| 1,024,767 A | * | 4/1912 | Dempster | 43/121 |
| 1,540,621 A | * | 6/1925 | Hanson | A01M 1/2011 |
| | | | | 43/131 |

(Continued)

FOREIGN PATENT DOCUMENTS

| CA | 2727723 A1 * | 1/2010 | A01M 1/02 |
| CA | 3030854 A1 * | 1/2018 | A01G 13/0275 |
| WO | WO-2006045122 A2 * | 4/2006 | A01M 1/2005 |

OTHER PUBLICATIONS

"Development of a pheromone trap for monitoring Tribolium castaneum," M. Mullen. Oct. 1992. Journal of Stored Products Research. vol. 28, issue 4, pp. 245-249. (Year: 1992).*

(Continued)

*Primary Examiner* — Morgan T Jordan
(74) *Attorney, Agent, or Firm* — Muncy, Geissler, Olds & Lowe, P.C.

(57) ABSTRACT

A sexual attraction pheromone exclusively obtained from *Tribolium castaneum* male insects, a method to obtain said pheromone and a device useful for controlling insects in grain silos are disclosed. The device comprises an outer shell, a membrane impregnated with the sexual attraction pheromone and a nucleus containing an insecticide formulation comprising effective amount of an isolated microsclerotia of *Beauveria bassiana* and an agronomically acceptable carrier.

4 Claims, 8 Drawing Sheets

(51) Int. Cl.
*A01N 49/00* (2006.01)
*A01N 65/00* (2009.01)

(58) Field of Classification Search
USPC .................................................. 43/114, 121
See application file for complete search history.

(56) References Cited

U.S. PATENT DOCUMENTS

| | | | | |
|---|---|---|---|---|
| 2,784,520 | A * | 3/1957 | Johnson | A47G 19/26 43/115 |
| 4,030,233 | A * | 6/1977 | Wunsche | A01M 1/103 43/121 |
| 4,130,245 | A * | 12/1978 | Bryson | A01M 1/2044 239/34 |
| 4,244,135 | A * | 1/1981 | Harwoods | A01M 1/02 43/122 |
| 4,251,946 | A * | 2/1981 | Lindley | A01M 25/004 43/131 |
| 4,802,303 | A * | 2/1989 | Floyd, III | A01M 1/02 43/131 |
| 4,813,174 | A * | 3/1989 | Cook | A01M 1/02 206/0.5 |
| 4,817,868 | A * | 4/1989 | Cook | A01M 1/02 239/57 |
| 4,921,703 | A * | 5/1990 | Higuchi | A01N 25/34 424/419 |
| 5,069,231 | A * | 12/1991 | Rutherford | A01K 55/00 131/273 |
| 5,070,891 | A * | 12/1991 | Rutherford | A01K 55/00 131/273 |
| 5,189,831 | A * | 3/1993 | Miller | A01N 25/34 43/132.1 |
| 5,413,784 | A * | 5/1995 | Wright | A01N 63/30 424/84 |
| 5,452,540 | A * | 9/1995 | Dowd | A01M 1/02 43/107 |
| 5,588,250 | A * | 12/1996 | Chiba | A01M 1/02 43/115 |
| 5,685,109 | A * | 11/1997 | Rimback | A01M 1/2016 43/107 |
| 5,737,870 | A * | 4/1998 | Thind | A01N 25/006 43/132.1 |
| 5,842,305 | A * | 12/1998 | Liao | A01M 1/106 43/118 |
| 5,983,558 | A * | 11/1999 | Las | A01M 1/2011 43/131 |
| 6,018,905 | A * | 2/2000 | Lingren | A01M 1/02 43/107 |
| 6,058,646 | A * | 5/2000 | Bishoff | A01M 1/2011 43/132.1 |
| 6,192,621 | B1 * | 2/2001 | Fain | A01M 1/02 43/131 |
| 6,216,384 | B1 * | 4/2001 | Dickson | A01M 1/2011 43/132.1 |
| 6,370,813 | B1 * | 4/2002 | Nelson | A01M 1/2005 43/131 |
| 6,517,856 | B1 * | 2/2003 | Roe | G01N 33/5085 43/132.1 |
| 6,637,149 | B1 * | 10/2003 | Bauer | A01M 1/106 43/107 |
| 6,796,082 | B1 * | 9/2004 | Duston | A01M 1/2011 43/131 |
| 7,412,797 | B1 * | 8/2008 | Hiscox | A01M 1/02 43/107 |
| 7,694,456 | B1 * | 4/2010 | Curtis | A01M 1/106 43/107 |
| 8,418,399 | B2 * | 4/2013 | Palencia-Adrubau | A01N 25/34 43/107 |
| 9,179,662 | B1 * | 11/2015 | Kort | A01M 1/10 |
| 10,765,101 | B2 * | 9/2020 | Willert | A01M 1/02 |
| 2002/0032980 | A1 * | 3/2002 | Nelson | A01M 1/145 43/113 |
| 2002/0061324 | A1 * | 5/2002 | Light | A01M 1/02 424/405 |
| 2002/0112396 | A1 * | 8/2002 | Nyberg | A01M 25/008 43/121 |
| 2002/0134004 | A1 * | 9/2002 | Gordon | A01M 1/2005 43/132.1 |
| 2003/0070348 | A1 * | 4/2003 | Spragins | A01M 1/026 43/121 |
| 2004/0001870 | A1 * | 1/2004 | Durand | A01M 1/02 424/405 |
| 2004/0068781 | A1 * | 4/2004 | Hill | A61L 9/03 4/222 |
| 2004/0088905 | A1 * | 5/2004 | Price | A01M 1/2016 43/131 |
| 2004/0244274 | A1 * | 12/2004 | Dellevigne | A01M 25/004 43/131 |
| 2005/0000147 | A1 * | 1/2005 | Westphal | A01M 1/2011 43/131 |
| 2005/0147634 | A1 * | 7/2005 | Plato | A01M 1/02 514/141 |
| 2006/0191189 | A1 * | 8/2006 | Mayo | A01M 1/2011 43/131 |
| 2008/0196296 | A1 * | 8/2008 | Studer | A01M 1/14 43/107 |
| 2008/0245797 | A1 * | 10/2008 | Berge | A01M 1/2005 29/428 |
| 2008/0302000 | A1 * | 12/2008 | Kidder | A01M 1/2005 43/131 |
| 2009/0000181 | A1 * | 1/2009 | Cink | A01M 1/2011 43/132.1 |
| 2010/0071254 | A1 * | 3/2010 | Calkins | A01M 1/145 43/107 |
| 2011/0072712 | A1 * | 3/2011 | Black | A01M 1/02 43/123 |
| 2011/0146133 | A1 * | 6/2011 | Bunker | A01M 23/00 43/132.1 |
| 2011/0289822 | A1 * | 12/2011 | Duehl | A01M 1/103 43/121 |
| 2012/0246998 | A1 * | 10/2012 | Vasudeva | A01M 1/023 43/123 |
| 2013/0091758 | A1 * | 4/2013 | Hiley | A01N 25/006 43/132.1 |
| 2014/0311016 | A1 * | 10/2014 | Wang | A01N 35/02 426/1 |
| 2015/0121746 | A1 * | 5/2015 | Osinga | A01N 63/30 43/132.1 |
| 2015/0164060 | A1 * | 6/2015 | Pankowski | A01M 1/14 43/132.1 |
| 2015/0335003 | A1 * | 11/2015 | Zeamer | A01M 1/20 43/132.1 |
| 2015/0359228 | A1 * | 12/2015 | Grasso | A01M 1/02 43/132.1 |
| 2015/0366210 | A1 * | 12/2015 | Olson | A01M 1/026 43/132.1 |
| 2016/0316726 | A1 * | 11/2016 | Birger | A01M 29/32 |
| 2016/0366870 | A1 * | 12/2016 | Leier | A01M 1/02 |
| 2017/0202199 | A1 * | 7/2017 | Patel | C12N 11/00 |

(56) References Cited

U.S. PATENT DOCUMENTS

| | | | |
|---|---|---|---|
| 2017/0231211 A1* | 8/2017 | Kupfer | A01M 1/2005 |
| | | | 43/113 |
| 2018/0014524 A1* | 1/2018 | Peterson | A01M 1/106 |
| 2018/0035657 A1* | 2/2018 | Ots | A01M 1/2016 |
| 2019/0234895 A1* | 8/2019 | Smilanich | G01N 27/123 |
| 2020/0060251 A1* | 2/2020 | DaSilva | A01M 1/023 |
| 2020/0344992 A1* | 11/2020 | Kaye | A01N 63/23 |

OTHER PUBLICATIONS

"Aggregation pheromone 4,8-dimethyldecanal and kairomone affect the orientation of Tribolium castaneum (Herbst) (Coleoptera: Tenebrionidae) adults" D. Dissanayaka et al. Dec. 2018. Journal of Stored Products Research. vol. 72, pp. 144-149. (Year: 2018).*
"Beauvaria plus Microhilum, Tritirachium, and Sporothrix" NA Jul. 28, 2011. ARSEF: USDA-ARS Biological Integrated Pest Management Research. (Year: 2011).*
K.W. Francke et al, "Chemical Signalling in Beetles," Topics in Current Chemistry (2005) vol. 240, pp. 85-166, Germany.
D.L. Faustini et al., "Sexually Dimorphic Setiferous Sex Patch in the Male Red Flour Beetle, *Tribolium castaneum* (Herbst) (Coleoptera: Tenebrionidae): Site of Aggregation Pheromone Production," Journal of Chemical Ecology, vol. 7, No. 2, 1981, Madison, Wisconsin.
L. Arnaud et al., "Is Dimethyldecanal a Common Aggregation Pheromone of *Tribolium* Flour Beetles?", Journal of Chemical Ecology, vol. 28, No. 3, Mar. 2002, Gembloux, Belgium.

* cited by examiner

SEXUAL ATTRACTION PHEROMONE OF TRIBOLIUM CASTANEUM AND INSECT CONTROL DEVICE

TECHNICAL FIELD

The present invention relates to an insect sexual attraction pheromone and to a device useful for controlling pests, in particular insects, in grain silos. The device comprises an outer shell, a membrane impregnated with a sexual attraction pheromone extracted from *Tribolium castaneum* males and an interior region comprising insecticide formulation.

BACKGROUND

Insect control devices with a "lure and trap" mechanism often include a luring composition, such as an aggregation pheromone, to attract insects, as well as an insecticide formulation or other pest control compounds. Several of these compounds may require carefully controlled conditions in order to activate the biological mechanisms involved in the insecticidal effect. For example, bioinsecticides based on dormant forms of several entomopathogenic fungi may be activated under adequate humidity conditions. These conditions may be obtained through the aggregation of a certain number of insects in the vicinity of these dormant forms. When the adequate conditions are met, the dormant forms activate, and the insecticidal effect is achieved. A sexual attraction pheromone, which targets only insects of a certain sex, can be advantageously used to achieve these controlled conditions.

4,8-dimethyldecanal, also known as tribolure, is an aggregation pheromone of *Tribolium castaneum*. Although it has been mistakenly reported as a "sexual pheromone", it has been found that this molecule attracts both male and female insects, therefore not constituting a true sexual pheromone.

There is therefore a need to provide a sexual pheromone of *Tribolium castaneum* useful for insect control devices employing a luring composition.

SUMMARY OF THE INVENTION

In a first aspect, an object of the present invention is an isolated sexual attraction pheromone of *Tribolium castaneum* that is exclusively obtained from male insects. The pheromone has an average molecular weight of approximately 210 g/mol, a molecular formula of $C_{14}H_{26}O$ and a chemical structure having only one degree of unsaturation and a terminal carbonyl group.

In a second aspect, an object of the present invention is a method to obtain an isolated sexual attraction pheromone from a plurality of male insects, comprising the steps of:
  placing the plurality of male insects in an airtight container comprising a solid support,
  placing and maintaining the container on a stove to generate volatile organic compounds,
  separating the plurality of male insects from the solid support,
  extracting the volatile organic compounds from the solid support using solid-phase microextraction fibers, and
  isolating of the pheromone from the volatile organic compounds by capillary gas chromatography.

In a preferred embodiment of the second aspect, said solid support is selected from filter paper and a feed medium comprising flour. Preferably, the feed medium comprises about 30 g of flour.

In another preferred embodiment of the second aspect, the container is maintained on a stove for a period of approximately one month.

In a third aspect, it as an object of the present invention an insect control device comprising:
  an outer shell comprising a plurality of orifices,
  a central membrane impregnated with a luring composition, and
  an interior region comprising an insecticide formulation.

In a fourth aspect, it as an object of the present invention an insect control device comprising:
  an outer shell comprising a plurality of orifices,
  a central membrane impregnated with the isolated sexual attraction pheromone of *Tribolium castaneum* of the first aspect of the invention, and
  an interior region comprising an insecticide formulation.

In preferred embodiments of the third and fourth aspects, said membrane is comprised in a capsule attached to the outer shell.

In preferred embodiments of the third and fourth aspects, said capsule further comprises a conical surface. Preferably, said conical surface has a smooth, polished and shining surface.

In further preferred embodiments of the third and fourth aspects, the insecticide formulation comprises an effective amount of isolated microsclerotia of *Beauveria bassiana* and an agronomically acceptable carrier. Such microsclerotia are described in U.S. patent application No. 62/815,541, the contents of which are incorporated by reference herein.

In yet further preferred embodiments of the third and fourth aspects, the interior region is located in a lower portion of the device.

DETAILED DESCRIPTION OF THE INVENTION

Figure 1:
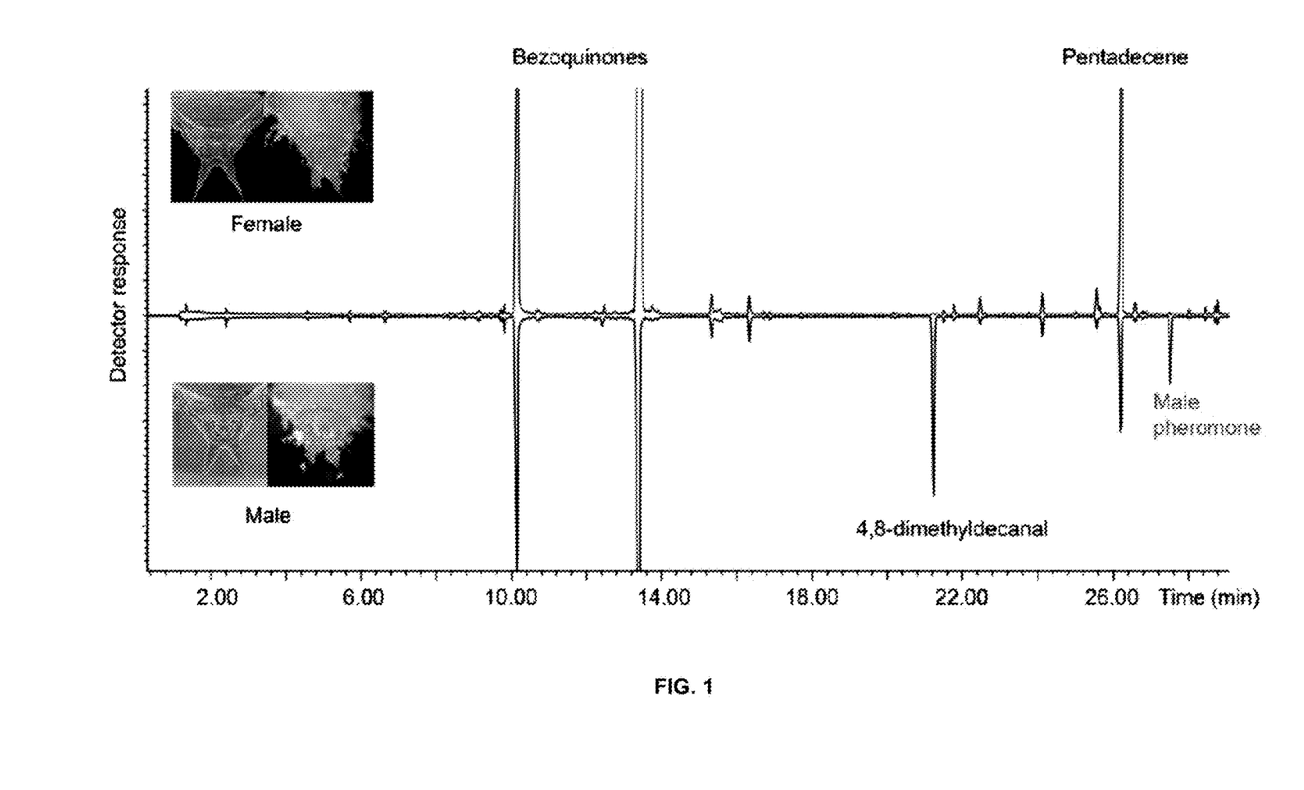
FIG. 1 shows a chromatograph with the main components of male *Tribolium castaneum* extracts.
Figure 2:
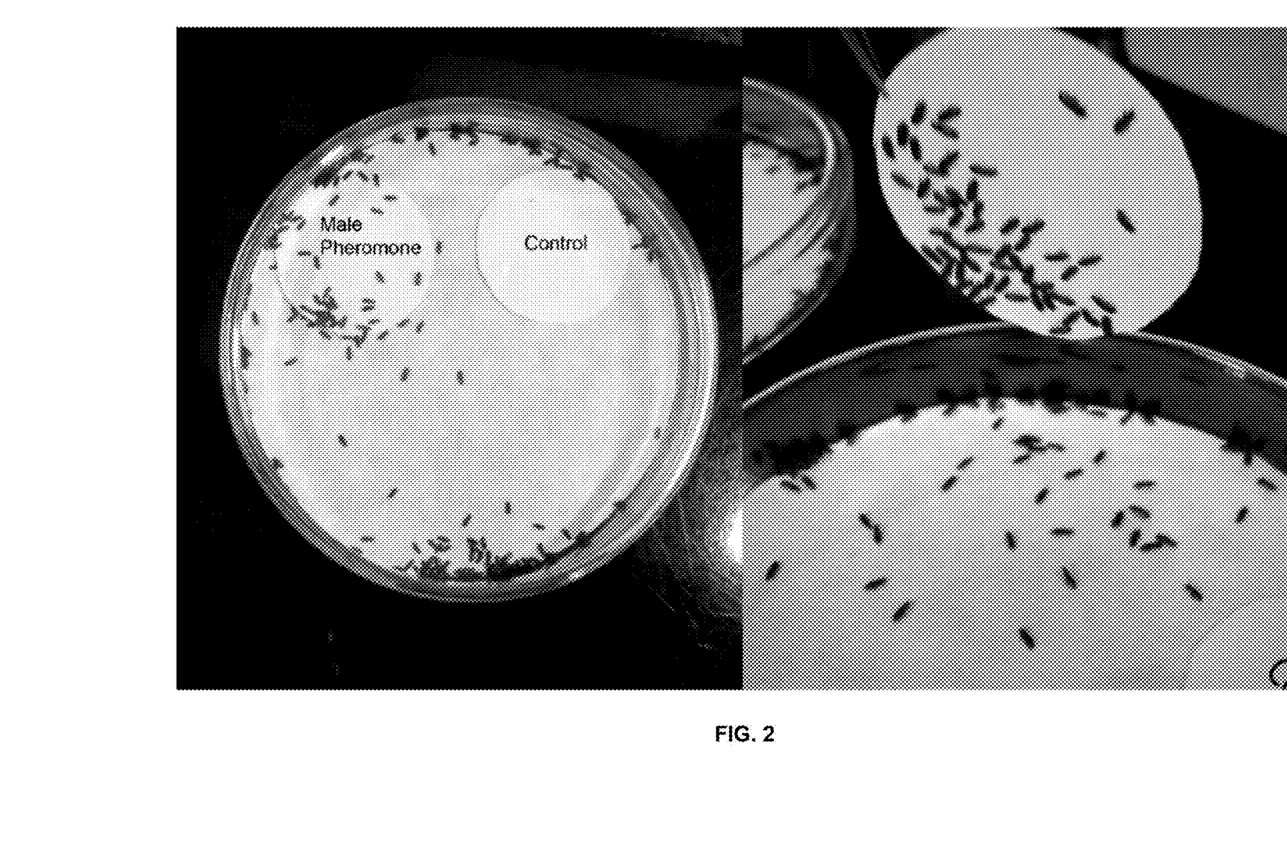
FIG. 2 shows the attraction of female insects to a paper impregnated with the sexual pheromone of the present invention.
Figure 3:
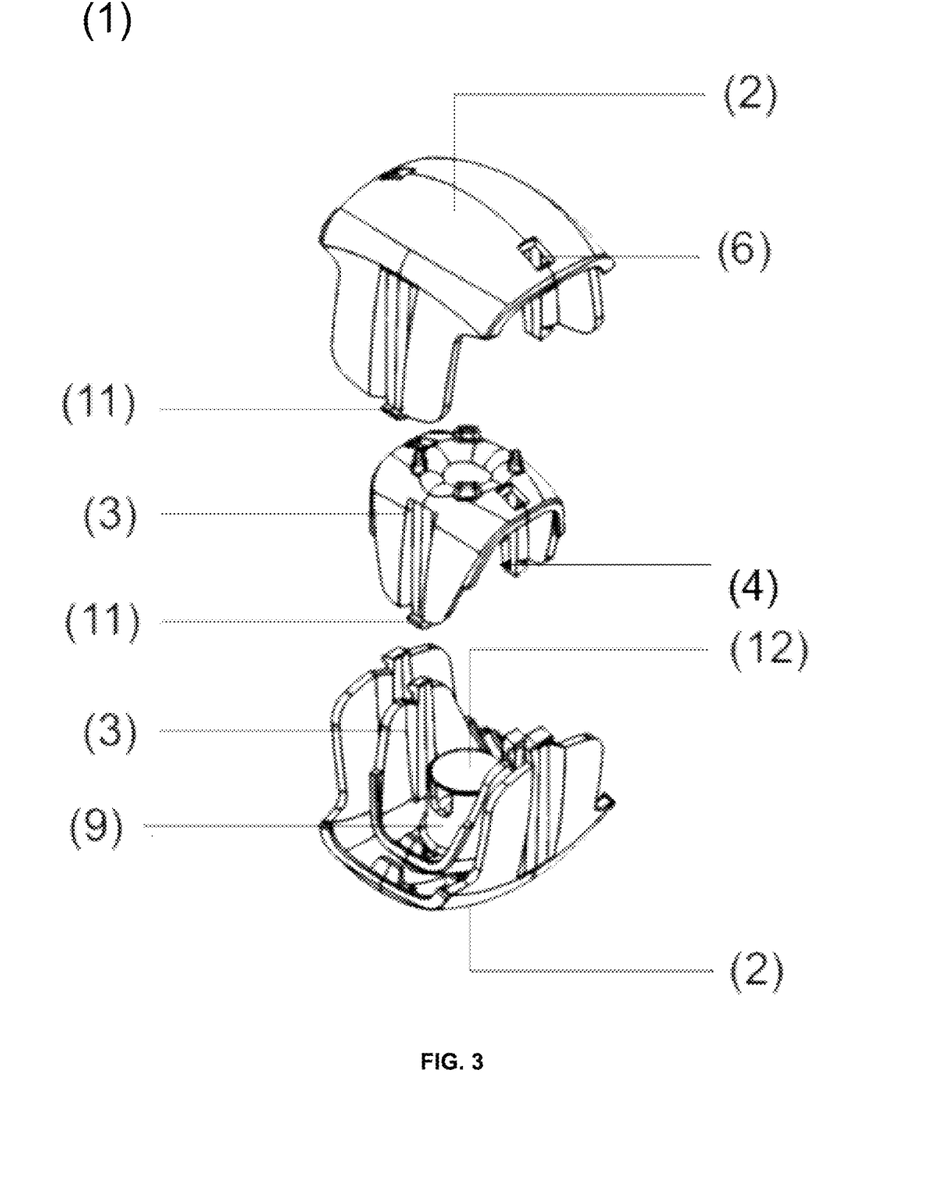
FIGS. 3 to 6 show embodiments of the insect control device of the present invention as well as its individual components.
Figure 4:
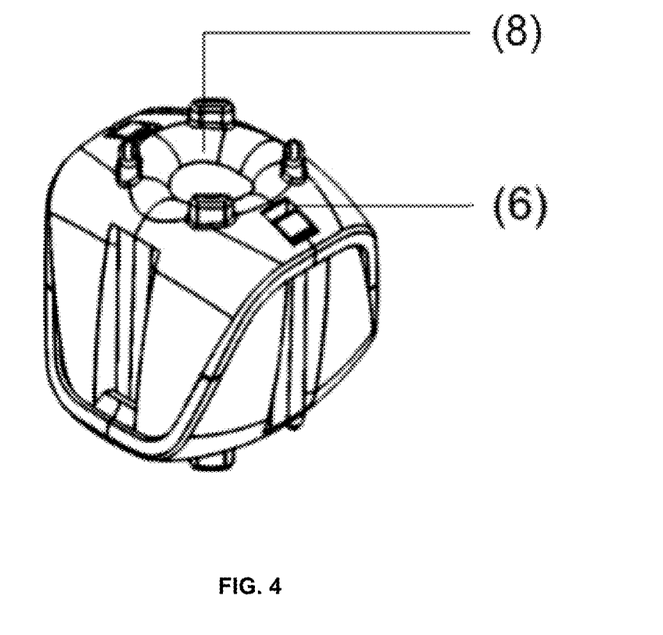
Figure 5:
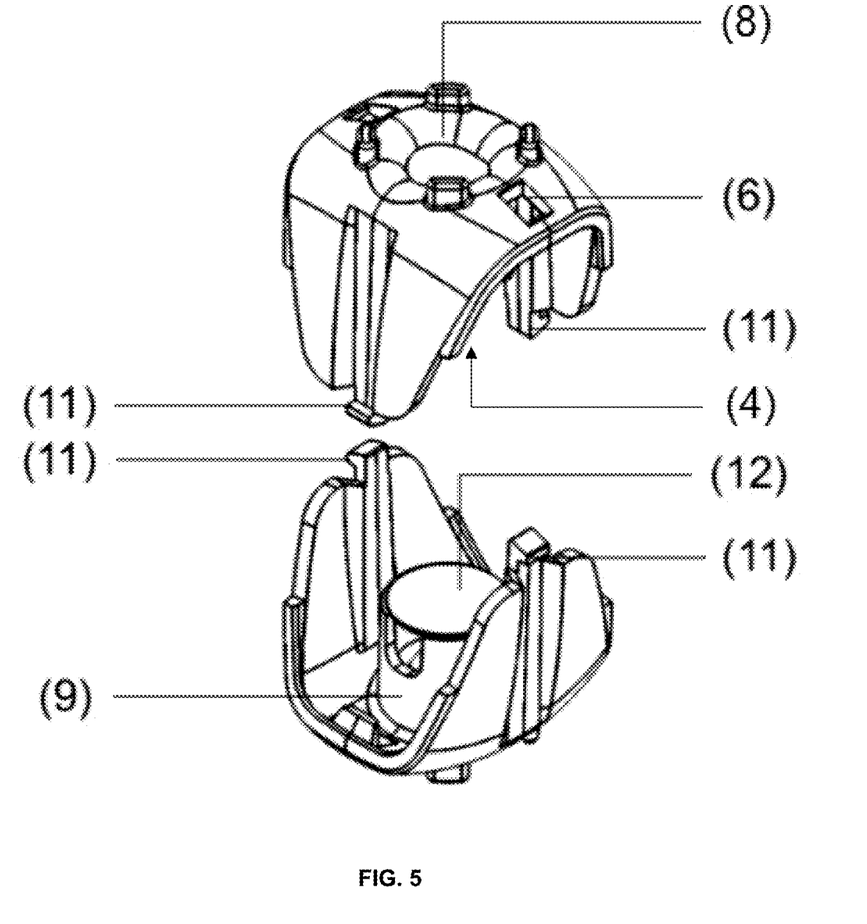
Figure 6:
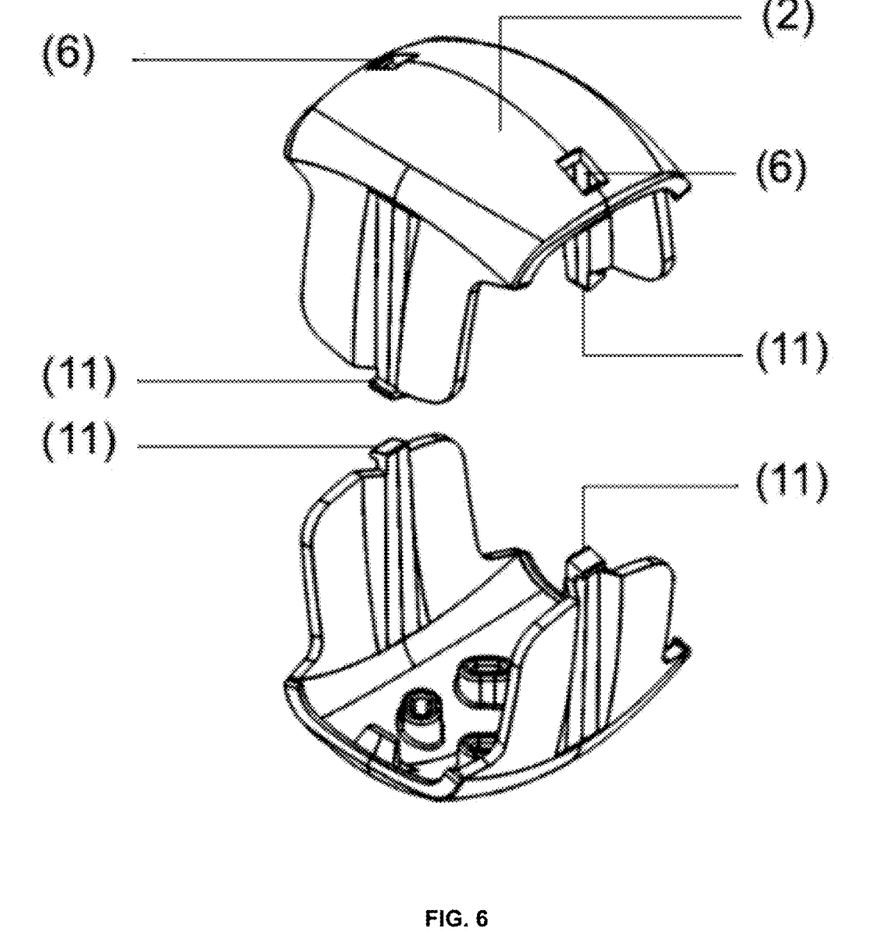
Figure 7:
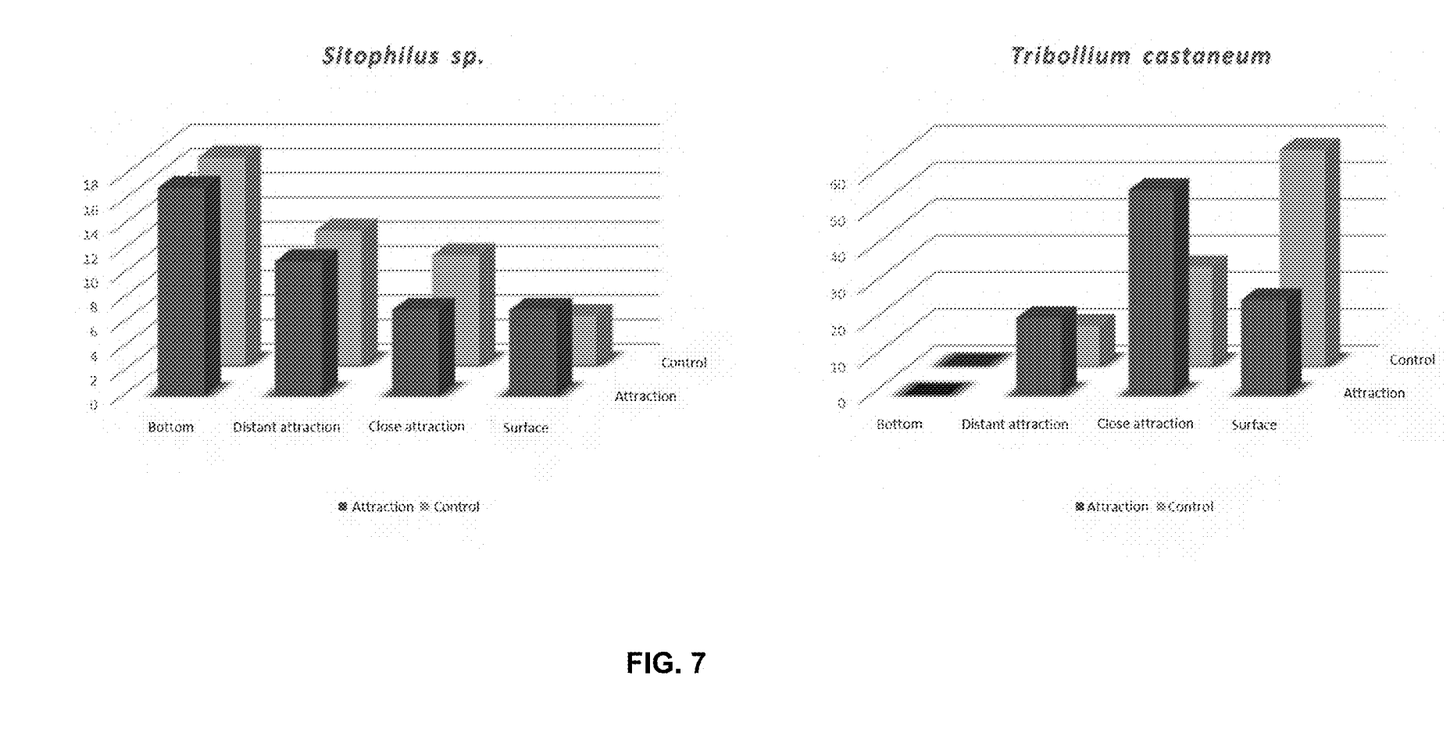
FIG. 7 shows the results of the use of the insect control device of the present invention in a laboratory-scale silo containing 5 kg of wheat.
Figure 8:
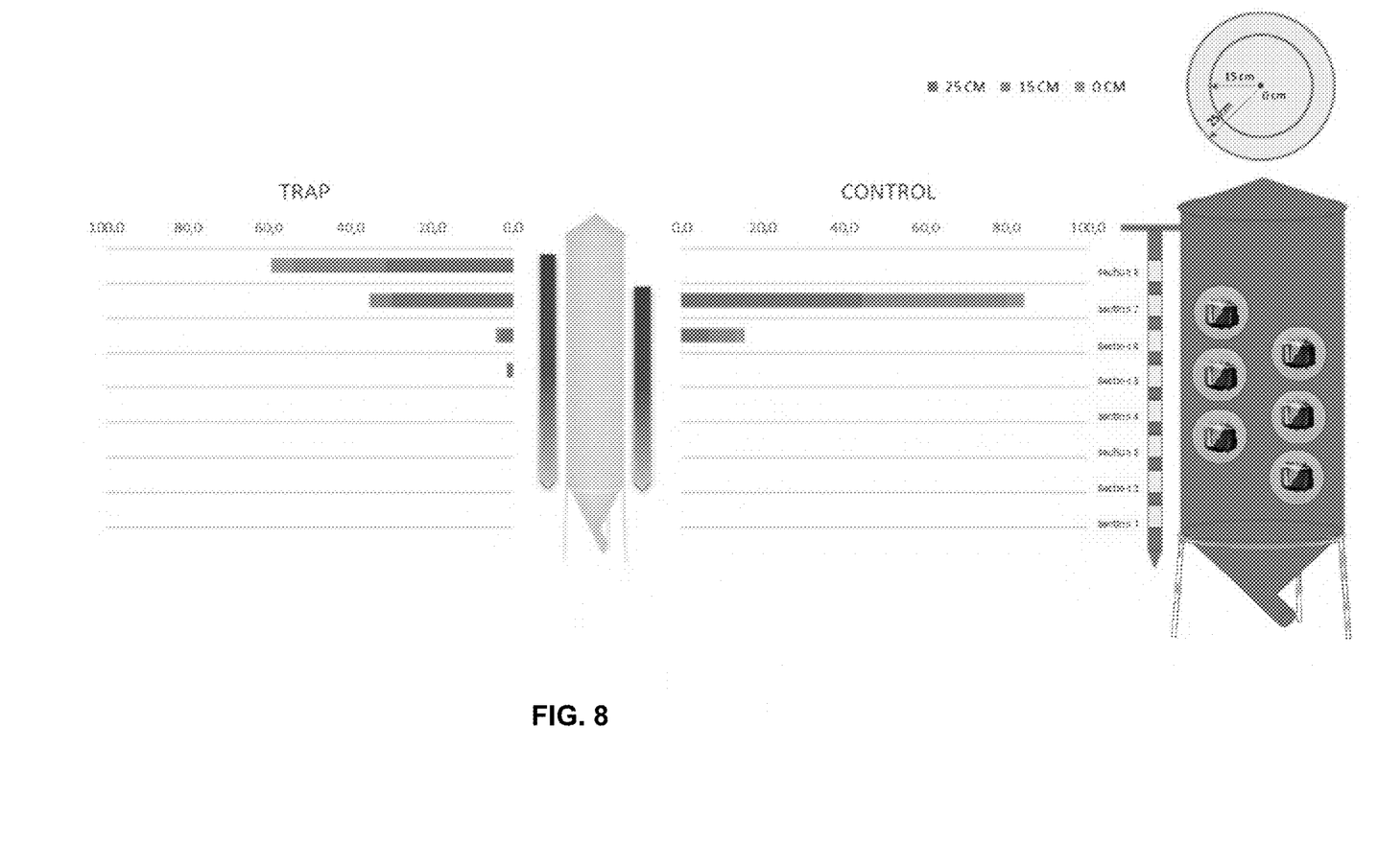
FIG. 8 shows the results of the use of the insect control device of the present invention in a pilot-plant scale silo containing 20 kg of wheat.

The present invention will be described in detail below, with reference to the figures and examples, which are included only for the purpose of illustrating the invention and are not to be construed as limiting thereof.

The term "approximately" as used herein when referring to a measurable value means that it comprises variations of ±10% from the specified amount.

As used herein, the terms "comprises", "has" and "includes" and their conjugations mean "including but not limited to".

The sexual pheromone of the present invention is biosynthesized exclusively by male *Tribolium castaneum* insects and thus constitutes a true sexual pheromone, as opposed to those of the prior art.

The insect control device of the present invention operates by a "lure and trap" mechanism. In an embodiment, insects are attracted and aggregate into the inside of the device, by crawling through the orifices of the outer shell. In an embodiment of the device, when a certain number of insects has entered the device, the resulting humidity conditions activate a bioinsecticide formulation. In the case of bioinsecticides comprising microsclerotia, adequate humidity conditions will cause the proliferation of conidia from the microsclerotia.

In this manner, the initial charge of bioinsecticide can be activated several times and in response to the entrance and exit of insects into the device.

Alternatively, when a single insect or a lower number of insects enter the device, they become impregnated with a bioinsecticide in dormant form (i.e. microsclerotia). This form will yield a large number of conidia when the humidity conditions are met, for example in the insects' nests.

EXAMPLES

1) Extraction of *Tribolium castaneum* Sexual Pheromone Insects

Specimens of pest insects of stored grains, *Tribolium castaneum*, were employed. The insects were bred in 500 mL glass jars covered with a fine cloth net and kept in a breeding chamber at 27±2° C. and 70±5% relative humidity, with a light: darkness photoperiod of 12 h/12 h.

The insects were fed a mixed diet of wheat flour (85%), brewer's yeast (5%), wheat germ (5%) and skimmed milk powder (5%).

During the pupa stage, males and females were separated taking into account the morphological differences of both sexes and were kept in the diet until adult molting, thus obtaining virgin insects.

For the extraction of the pheromone of *Tribolium castaneum*, pools of 200 male insects were employed, which were placed in individual 200 mL containers with 30 grs of flour and kept in the stove in the above-mentioned conditions for a period of 1 month. Finally, the insects were separated, and 90 grs of flour were placed in 250 mL Erlenmeyer flasks sealed with a Teflon lid with a septum to aid the extraction of volatile organic compounds (VOCs).

Extraction in Solid Phase

The VOCs released by *Tribolium castaneum* males were extracted from the head space of the Erlenmeyer flasks containing the flour using solid-phase microextraction fibers (SPME) of intermediate polarity composed of polydimethylsiloxane/divinylbenzene and the sample was taken for 60 minutes at room temperature (in a temperature range of 25 to 30° C.).

FIG. 1 shows the main components of the VOCs released by male and female *Tribolium castaneum*, including defense pheromones (benzoquinones) and aggregate pheromones (4,8-dimethyldecanal). The detector signal corresponding to the sexual pheromone of the present invention is only present in male insects.

Isolation of the Sexual Pheromone by Capillary Gas Chromatography

The VOCs extracted by SPME were analyzed and isolated by capillary gas chromatography (CGC). A Hewlett Packard 6850 gas chromatograph with a DB-5 non-polar capillary column was used. The injector was operated in splitless mode at 250° C., He gas was used as a carrier at constant flow rate of 1.5 mL/min, the furnace temperature was programmed at 40° C. for 0 min, 50° C./min at 100° C., 4° C./min at 220° C., with a retention time of 5 min at the final temperature. The flame ionization detector (FID) temperature was set to 280° C. This equipment is fitted with a microcontrol valve that allowed part of the analyzed sample to be diverted to the outside of the chromatograph, which is coupled with a transfer line maintaining the temperature of the column at 220° C. The fraction of interest was collected in a 4 mL flask at 0° C. The purity of the compound was verified using a Hewlett Packard 6890 chromatograph equipped with an infernal Zebron-5HT capillary column (30 m×0.25 mm I.D., F.T. 0.25 μm, Phenomenex, USA), in the above-mentioned conditions. The CGC was operated coupled to an Agilent 5975C VL mass selective detector (MSD). The MSD was operated in SCAN mode with a mass range of 35 to 650 u.m.a.; in electronic impact mode at 70 eV; transfer line at 320° C.; ionization chamber temperature at 230° C. and quadrupole at 150° C. The MSD was operated in SCAN mode with a mass range of 35 to 650 u.m.a.; in electronic impact mode at 70 eV; transfer line at 320° C.; ionization chamber temperature at 230° C. and quadrupole at 150° C.

Characterization of the Sexual Pheromone

Preliminary mass spectrometry analysis revealed a molecular weight of 210 g/mol, a twelve-carbon unsaturated backbone and at least one methyl-branch.

Further analysis provided a molecular formula of $C_{14}H_{26}O$ and a chemical structure having only one degree of unsaturation and a terminal carbonyl group.

FIG. 2 shows the attraction of female insects to a paper impregnated with a solution comprising the extracted male pheromone.

2) Insect Control Device

FIGS. 3 to 6 show different configurations of the device of the present invention, representing exemplary and non-limiting embodiments of the device and/or individual components thereof.

The device (1) of the present invention comprises an outer capsule (2) and an inner capsule (3). An interior region (4) of the inner capsule (3), comprising an insecticide formulation, is the compartment defined by inner capsule (3). The capsules are coupled to each other by shape correspondence and are arranged concentrically. In this manner, the insect which is crawling in the interior of the device (1) is forced to go through the inner capsule (3) in order to reach the interior region (4) comprising the insecticide.

The outer capsule (2) defines the outer shell of the device, which is provided with a plurality of orifices (6), so that insects may crawl into or out of the device.

The inner capsule (3) comprises an entrance zone (8) which is an entrance to the interior region (4) and may also comprise other orifices (6), when configured as an "open inner capsule". An open inner capsule allows the insect to freely crawl about it, entering and exiting the inner capsule without being retained. A closed inner capsule, i.e. an inner capsule without orifices other than the entrance zone, allows the insect to remain contained inside the inner capsule; this can be achieved by providing a conical or a cylindrical surface (9) inside the inner capsule. Once in contact with the smooth, polished and shining surface conical or cylindrical surface (9), the insects will remain trapped inside, since they will not be able to crawl up the surface (9). In this manner, insects remain in the interior of the inner capsule (3) until they are removed or liberated.

The closing of the device is ensured by flexible fasteners (11) provided in the inner and outer capsules, thus obtaining semi-permanent couplings.

The interior region (4) of the device of the present invention comprises a membrane (12), located inside the interior region (4) and impregnated with a substance acting as a lure mechanism. For example, the isolated sexual pheromone of the present invention may be used. Due to its central location, the membrane will generate an adequate concentration gradient of the substance in the surrounding air by diffusion and natural convection, thus promoting the luring effect.

Insecticides that may be used for the interior region comprise bioinsecticides, such as dormant forms as antipathogenic fungi, such as *Beauveria bassiana* microsclerotia. Since these dormant forms require controlling humidity conditions in order to ensure a controlled release, their combination with the sexual pheromone of the present invention, which only attracts female insects, is advantageous to achieve a controlled and efficient release of an insecticide formulation.

3) Use of the Insect Control Device in a Laboratory Scale Silo

FIG. 7 illustrates the attraction effect of a luring composition comprising the isolated sexual pheromone of the present invention obtained from *Tribolium castaneum* male insects in two laboratory-scale silo containing 5 kg of wheat of the Audaz variety.

Two sets of experiments were carried out: each set consisted of a "control" silo, containing an insect control device without any luring composition, and an "attraction" silo, containing the insect control device of the present invention, i.e. with a luring composition comprising the isolated sexual attraction pheromone of male *Tribolium castaneum.*

The left hand side of FIG. 7 shows the results for the distributions of insects for different positions inside the control and model silos containing *Sitophilus* sp insects. It can be seen that for the control species *Sitophilus* sp., both the control and the attraction silos have equivalent insect distributions.

The right hand side FIG. 7 shows the corresponding results for silos containing *Tribolium castaneum* insects. In this case, it is observed that this species is distributed such that the number of insects closer to the insect control device is higher, which illustrates the successful and specific attraction of *Tribolium castaneum* insects using the luring composition of the present invention.

4) Use of the Insect Control Device in a Pilot-Plant Scale Silo

The insect control device was further tested in pilot-plant scale silos containing 200 kg of wheat of the Audaz variety.

Two experiments were carried out: the first in a "control" silo, containing six insect control devices, each one without any luring composition, and the second in an "attraction" silo, containing six insect control devices of the present invention, i.e. each one with a luring composition comprising the isolated sexual attraction pheromone of male *Tribolium castaneum.*

FIG. 8 shows the results for the distributions of insects for different positions inside the control and model silos containing *Tribolium castaneum* insects. The graph in FIG. 8 represents the percentage of insects found in different areas of the silo, as defined by three radial sections in the silo, corresponding to 0 cm, 15 cm and 25 measured from the center of the silo, as well as 8 longitudinal sections from the bottom of the silo to the loading surface.

When comparing the obtained results for the distribution of female *Tribolium castaneum* insects, it can be observed that the insects are attracted to the part of the "attraction" silo containing the insect control devices, as evidenced by the distribution in the right hand side of the graph in FIG. 8, and compared to the distribution in the left hand side of the graph in FIG. 8, corresponding to the experiment in the "control" silo (i.e. insect control devices without any luring composition).

The invention claimed is:

1. An insect control device comprising:

an outer shell comprising a plurality of orifices, a membrane impregnated with a luring composition, the luring composition comprising an isolated sexual attraction pheromone of male *Tribolium castaneum* as the sole luring pheromone, wherein the sexual attraction pheromone of male *Tribolium castaneum* has a molecular weight of approximately 210 g/mol, a molecular formula of $C_{14}H_{26}O$ and a chemical structure having only one degree of unsaturation and a terminal carbonyl group, and an inner capsule located inside the outer shell, which defines an interior region comprising an insecticide formulation comprising isolated microsclerotia of *Beauveria bassiana.*

2. The insect control device according to claim 1, wherein said membrane is comprised in a capsule attached to the outer shell.

3. The insect control device according to claim 2, wherein said capsule comprises a conical surface.

4. The insect control device according to claim 1, wherein the insecticide formulation comprises isolated microsclerotia of *Beauveria bassiana* and an agronomically acceptable carrier.

* * * * *